Patented Sept. 14, 1943

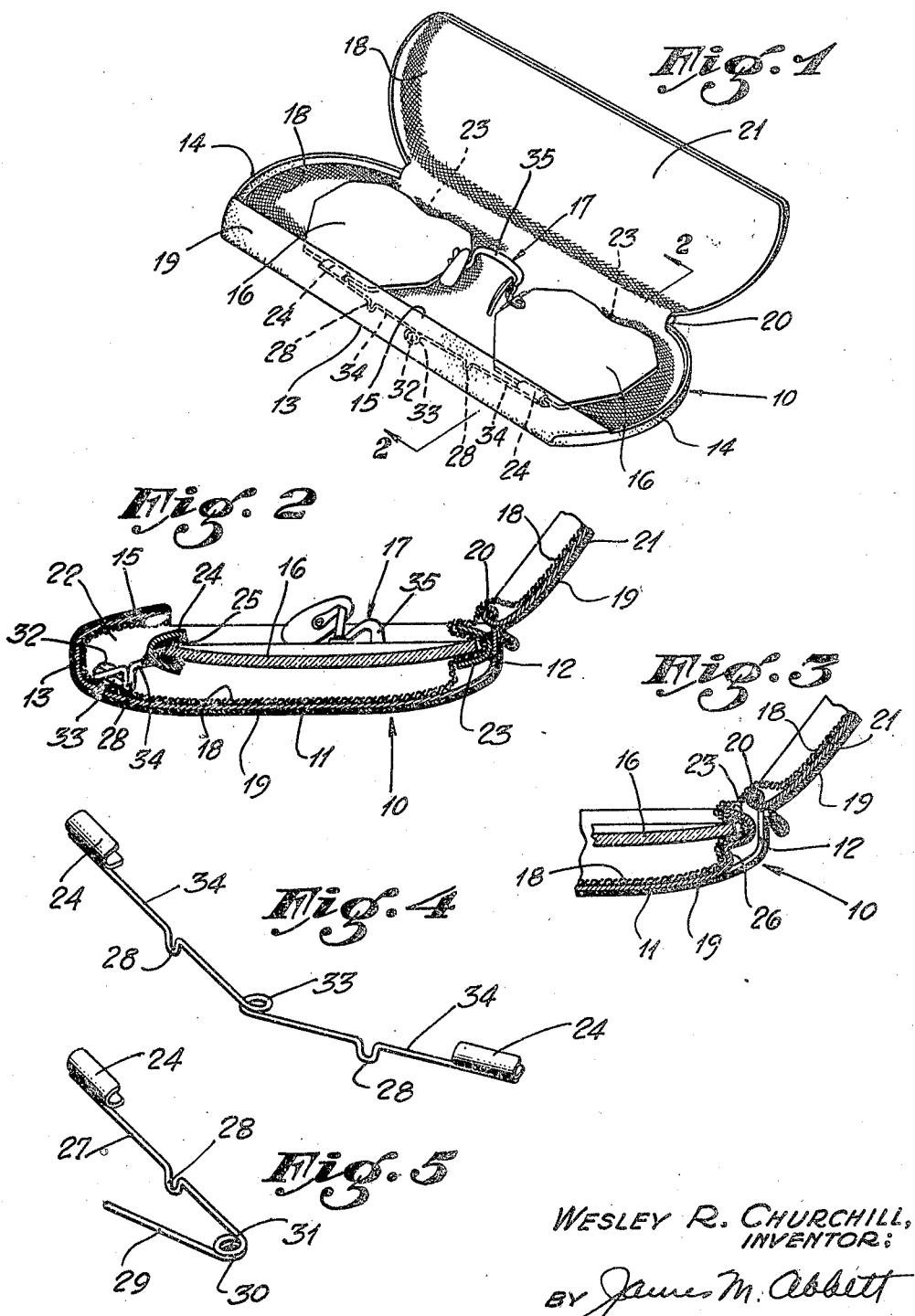

2,329,253

UNITED STATES PATENT OFFICE 2,329,253

SPECTACLE CASE

Wesley R. Churchill, Hollywood, Calif.

Application December 17, 1940, Serial No. 370,451

3 Claims. (Cl. 206—6)

This invention relates to a spectacle case.

When spectacles are supplied to a patient by an optician or the like they are usually placed in a spectacle case, which is intended to prevent the breakage of the glasses. In actual practice, however, it has been found that when the case is dropped or violently jarred the glasses may break, and quite often a complaint is made to the optician charging that the glasses were improperly made or mounted, with the result that expensive replacements must be made often by the optician in order to satisfy the customer. It is also found that when spectacles and other types of eye-glasses are placed within a case the convexed surfaces of the lenses bear against the bottom of the case. This tends to scratch the surface and to mar the polish of the lenses. It is the principal object of the present invention to provide a simple and inexpensive spectacle case into and out of which spectacles and other types of eye-glasses may be instantly positioned or removed, the structure gripping the spectacles to hold them rigidly within the case, and at the same time to support the lenses out of contact with the walls of the case, whereby scratching might take place or impact with the walls be transmitted to the lenses tending to break the same.

The present invention contemplates a provision of the usual spectacle case having a lower portion forming a receptacle for the spectacles and a hinged cover therefor, the structure including rigid seats along one edge of the receptacle portion and yieldable means providing seats along the opposite edge of the receptacle, whereby the fixed and yieldable seats will receive and support the lenses of a pair of spectacles, eye-glasses, or the like, which may be placed therein.

The invention is illustrated by way of example in the accompanying drawing, in which:

Figure 1 is a view in perspective showing one form of the invention indicating a pair of spectacles in place therein.

Fig. 2 is an enlarged view in transverse section taken through the spectacle case, as seen on the line 2—2 of Fig. 1, and indicating the manner in which a lens is gripped and supported.

Fig. 3 is an enlarged fragmentary view showing another form of fixed seat for the lens.

Fig. 4 is a view in perspective showing the pair of yieldable seats and the spring means supporting the same.

Fig. 5 is a view in perspective showing another form of yieldable lens seat and its individual spring support.

Referring more particularly to the drawing, 10 indicates the container portion of a spectacle case. This is substantially pan shaped, having a bottom wall 11 continuing in a back wall 12, a front wall 13 and end walls 14. It is preferable that this entire structure shall be made of a metal stamping. Formed along the upper marginal edge of the front wall 13 is an overhanging retaining flange 15. This stands substantially parallel to the bottom wall 11 and is spaced therefrom a distance sufficient to accommodate the forward edges of the lenses 16 of a spectacle or nose piece structure 17. The inner face of the container thus formed is preferably covered with a cushion layer of fabric 18, such as velvet. The outer face of the container walls is preferably covered with a layer 19 of leather or the like. Formed along the upper marginal edge of the rear wall portion 12 is a hinge structure 20 by which a lid 21 is articulately connected to the container 10. It will be understood that the lid 21 may be covered on its inner face with fabric 18 and on its outer face with leather 19.

The foregoing construction describes a conventional type of spectacle case by way of example. It is understood that various other designs of cases may be provided if desired. In the use of these cases the spectacles or the like are placed within the receptacle portion 11 with the lower edges of the lenses extending into the space 22 which occurs between the bottom wall 11 and the flange 15. This flange acts to prevent the spectacles from falling out of the case accidentally when the lid is opened. It will be recognized, however, that the spectacles when so placed in a case must rest directly upon the floor 11 of the case, and that since there is some necessary space required on all sides of the spectacles, the spectacles or nose glasses may be jostled around in the case. This may result in breaking the lenses. It is the principal object of the present invention, therefore, to provide means within the case for quickly engaging the spectacles and for firmly holding them so that they will be held in spaced relation to the walls of the receptacle and its lid and will be held so that they cannot be jostled around in the case when it is closed.

The structure provided for holding the spectacles comprises a pair of fixed saddle elements 23 and a pair of yieldable saddle elements 24. The fixed saddle elements are preferably pressed from sheet metal and are U-shaped, as indicated in Fig. 2 of the drawing. These saddle elements are preferably covered with some soft material 25 such as velvet or the like. The saddles 23 are shown in Fig. 2 of the drawing as being made of a separate U-shaped piece of metal. In Fig. 3 of the drawing the saddles 23 are shown as being formed from a tang 26 which is struck out of the wall of the receptacle 10. The saddles 23 are elongated as shown in Fig. 1 of the drawing, so that they will accommodate lenses of different sizes, shapes and different spacing between lens centers. It will be seen from examining Figs. 2 and 3 that the saddles are spaced from the bottom wall 11. This is in order to support the concaved faces of the lenses out of contact with the covering on the floor 11. Disposed in spaced relation to the relatively fixed saddles 23 are the saddles 24. These are yieldably mounted to cooperate with the saddles 23 while engaging the diametrically opposite side of a lens from that seated within the saddle 23. These saddles are U-shaped in cross-section and are mounted upon spring supporting means. This supporting means may be either a single support for one saddle, as shown in Fig. 5, or a double support for the two necessary saddles 24, as shown in Fig. 4. The single support shown in Fig. 5 comprises a leg 27 made of suitable spring wire and having a downwardly extending undulation 28. A continuation of the spring wire forms a leg 29, the wire having been bent upon itself to provide a coil 30 having an eye 31 through which a mounting pin 32 may extend.

In the use of the form of the invention shown in Fig. 5 two of the structures are provided arranged to extend in opposite directions and to cooperate with the fixed saddles 23, in which event the legs 29 will rest against the wall 13 and will yieldably resist flexure of the leg 27.

In the form of the invention shown in Fig. 4 a continuous spring wire is provided having a coiled loop 33 intermediate its ends and spring legs 34 extending oppositely therefrom. The legs 34 are disposed at an obtuse angle to each other and will flex toward a line parallel to the forward wall 13 of the receptacle 10 when spectacles are positioned against the saddles.

It is to be understood that the saddles 23 and 24 may be covered with material 25 in order to protect the edges of the lenses or that the saddles themselves may be of non-metallic material which will provide a yieldable seat for the lenses.

The legs 34 are formed with spacing undulations 28 which extend downwardly. These elements rest against the floor portion 11 of the case and support the saddle members 24 at a sufficient distance above the floor 11 so that the lenses 16 will not at any time contact the walls of the case.

In operation of the present invention the case may be constructed with the unitary spring structure carrying the saddles 24, as shown in Fig. 4, or the separate springs shown in Fig. 5. It is also to be understood that the fixed saddles 23 may be either formed separately, as shown in Fig. 2, or struck from the case, as shown in Fig. 3. In any event, fixed saddles 23 will be disposed along one edge of the receptacle portion 10 of the case and yieldable saddles 24 will be disposed along the opposite edge and in spaced aligned relation to the saddles 23. This insures that a saddle 23 and a saddle 24 may cooperate to receive and grip a lens 16 yieldably therebetween. Thus, when it is desired to place a pair of spectacles or nose glasses within the case they may be grasped by a bridge piece 35, after which the lower edges of the lenses 16 are brought to register with the saddles 24. The bridge piece and the lenses may then be forced toward the end wall 13 and toward a position beneath the flange 15 until the spring legs 34 or the spring legs 27 are sufficiently flexed to permit the upper edges of the lenses to be seated within the relatively fixed saddles 23. Pressure on the bridge is then released, at which time the resilient legs will act through the saddles 24 to force the lenses upwardly into a positively set position within the saddles 23. Attention is directed to the fact that due to the spacing of the saddles 23 from the bottom wall 11 of the receptacle and from the lid 21 of the case and similar spacing of the yieldable saddles 24 as determined by the undulations 28, the lenses will be held in spaced relation to the lid and the bottom wall 11 and will prevent the spectacles from being jostled around in the case or from an impact blow delivered to the wall of the case to be transmitted to the lenses.

It will thus be seen that the structure here disclosed provides simple and effective means for insuring against breakage of lenses and for holding lenses of spectacles and eye-glasses in a manner to prevent them from becoming scratched or marred, the structure including means easily incorporated within the design and construction of spectacle cases as now made, while maintaining a sightly appearance for the case and while using means which are not complicated and may be actuated incident to the same motions now followed in placing spectacles in a case and removing them therefrom.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. In combination with a spectacle holder, a pair of spaced, relatively fixed saddle members spaced from the surface of said holder and spaced in relation to each other along one edge of the holder, a pair of movable saddle members mounted along the opposite edge of the holder and in complementary spaced relation to the fixed saddle members, said movable saddle members being spaced from the surface of the holder, and separate flexible means yieldably holding the movable saddle members and urging said saddle members toward the fixed saddle members.

2. In combination with a spectacle holder, a pair of relatively fixed saddle members spaced from the surface of said holder and spaced in relation to each other along one edge of the holder, a pair of movable saddle members mounted along the opposite edge of the holder and in complementary spaced relation to the fixed saddle members, means holding the movable saddle members in spaced relation to the surface of the holder, and flexible means yieldably holding the movable saddle members and urging said saddle members toward the fixed saddle members, the saddle members being U-shaped in cross-section to embrace marginal edges of the spectacles.

3. In combination with a spectacle case having a receptacle portion and a lid, the receptacle being formed with a bottom wall and marginal side and end walls, the lid being hinged to one side wall, a pair of U-shaped relatively fixed saddle members disposed adjacent to the side wall bearing the lid, grooves in said saddle members lying in a plane substantially parallel to the bottom wall and spaced therefrom, said saddle members being spaced longitudinally apart a distance substantially equal to the center-to-center distance of spectacle lenses, a pair of movable saddle members complementary to the fixed saddle members and grooved to receive the opposite marginal edges of lenses from the edges seated in the relatively fixed saddle members, yieldable spring members mounted within the receptacle and carrying the movable saddle members yieldably at their free ends, whereby to urge the movable saddle members toward the fixed saddle members, and spacing elements carried on said springs and engaging the bottom wall of the receptacle to space the movable saddle members therefrom.

WESLEY R. CHURCHILL.